Figure 1:
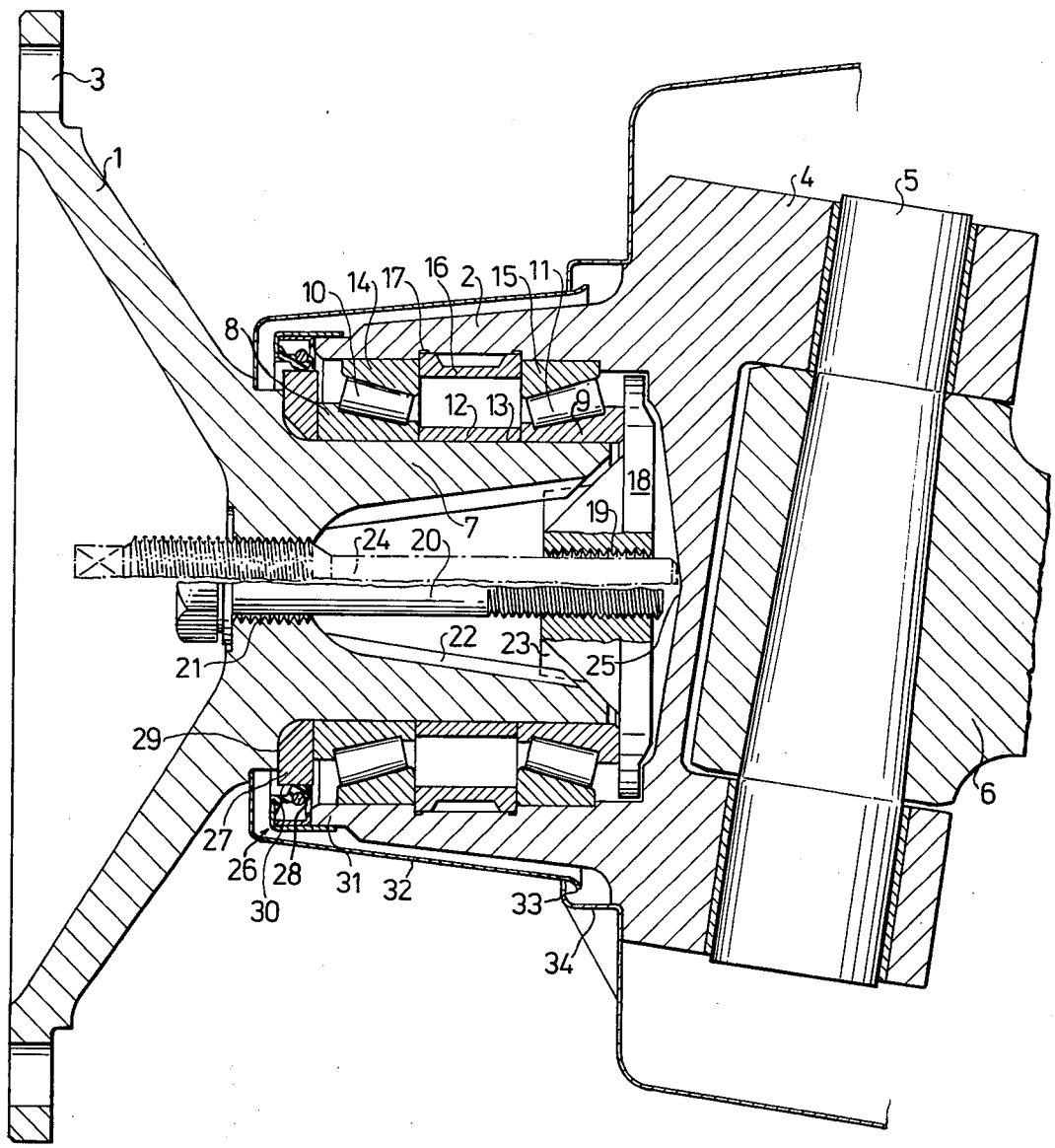

United States Patent [19]

Nordström

[11] 4,061,377
[45] Dec. 6, 1977

[54] BEARING ARRANGEMENT FOR NON-POWERED WHEELS ON VEHICLES

[75] Inventor: Sigurd Andrew Mauritz Nordström, Sodertalje, Sweden

[73] Assignee: Saab-Scania Aktiebolag, Sodertalje, Sweden

[21] Appl. No.: 700,952

[22] Filed: June 29, 1976

[30] Foreign Application Priority Data

July 7, 1975 Sweden .................................. 7507754

[51] Int. Cl.² ........................................... F16C 35/06
[52] U.S. Cl. ............................................. 308/207 R
[58] Field of Search ................... 308/191, 207 R, 208, 308/210

[56] References Cited

U.S. PATENT DOCUMENTS

| 3,425,760 | 2/1969 | Gordon | 308/207 R |
| 3,580,648 | 5/1971 | Zink | 308/207 R |

*Primary Examiner*—Robert R. Song
*Assistant Examiner*—Gene A. Church
*Attorney, Agent, or Firm*—Cushman, Darby & Cushman

[57] ABSTRACT

A bearing arrangement for a non-powered vehicle wheel. The wheel is provided with a hub neck for cooperation with a recess in a steering spindle. Said recess supports the outer rings of two roller bearings, the inner rings of which support the hub neck. The bearings are axially spaced apart by means of spacer sleeves. The wheel hub is secured axially by means of a centrally positioned hub bolt that passes freely through a hole in the hub and with its free end is screwed into a nut that is axially secured relative to said recess and that is rotating together with the inner ring of the inner bearing.

7 Claims, 2 Drawing Figures

BEARING ARRANGEMENT FOR NON-POWERED WHEELS ON VEHICLES

The present invention relates to a bearing arrangement for a non-powered wheel on vehicles, preferably heavier highway vehicles, in which bearing arrangement the hub of the wheel has a hub neck which engages in a sleeve which is non-rotatably secured in the vehicle, roller bearings being arranged between the hub neck and the sleeve, the hub and the roller bearings being held in the assembled position in the sleeve by means of a centrally positioned hub bolt.

In conventional bearing arrangements for non-powered vehicle wheels, roller bearings are placed between a stationary, non-rotating spindle and a rotary wheel hub. The inner rings of the roller bearings are mounted onto the spindle and their outer rings are pressed into the wheel hub. If the bearing arrangement is built up of two separate roller bearings, loose bearing parts must be assembled simultaneously as the hub is mounted onto the spindle when such a bearing arrangement is assembled. In series production of vehicles this is a very complicated and time-consuming process which has to be carried out under uncomfortable working conditions.

In the disassembly of such a bearing arrangement, relatively cumbersome puller tools are used to pull the hub off the spindle. Care is then required so that the occurring loose bearing parts are not dropped onto the floor or the like and become soiled or cause difficulties in some other manner.

Beyond said disadvantages in respect of time, the conventional bearing arrangements have a disadvantageous construction in terms of soilage. Prior to the hub being mounted onto the spindle, the bearing parts on the spindle are exposed and unprotected and the risk for dirt and/or foreign particles gaining access to the bearings is great. The soilage problem arises are early as in the manufacture and initial assembly of such bearing arrangements, but this problem is especially evident during assembly and disassembly of a wheel bearing arrangement on a soiled vehicle which has been temporarily withdrawn from traffic for inspection and service. Thus, in such servicing it is important that the work be carried out under great cleanliness and care.

A further disadvantage inherent in the conventional bearing arrangement appears when such a bearing arrangement is used for heavily loaded, steerable vehicle wheels. For such applications, mostly conical roller bearings mounted in pairs are used. In order that the wheel shall have a correct steering geometry, the bearing arrangement has had to be displaced in an outward direction. This, in turn, results in that the inner roller bearing will absorb a relatively much greater load than the outer roller bearing. This entails that a very expensive inner roller bearing must be chosen in order that an acceptable bearing life length shall be obtained.

The purpose of the present invention is to eliminate the above-mentioned disadvantages and to obtain a wheel bearing arrangement using inexpensive roller bearings and allowing simple and quick disassembly and assembly with small risk for soilage.

A bearing arrangement according to the invention is characterized in that two conical roller bearings are arranged between the hub neck and the sleeve, said roller bearings having races inclined towards each other, and spacer sleeves arranged between the respective inner and outer rings of the roller bearings, and in that the hub bolt passes freely through the central hole of the hub from the outer side of the same and is screwed into a nut or the like surrounded by the sleeve and locked against axial movement.

In this way the roller bodies of the roller bearings are subjected to less rotation than the roller bodies of a conventional wheel bearing arrangement. Another advantage is that most of the assembly work required can be performed as bench work by the assembly man.

Other characteristics of the invention are disclosed in the accompanying claims.

In the following, an embodiment exemplifying the invention shall be described with reference to the enclosed two figures of which FIG. 1 constitutes a longitudinal section of a bearing arrangement according to the invention in an assembled state and FIG. 2 constitutes a similar longitudinal section showing the position of the various parts of the bearing arrangement when the bearing arrangement is being disassembled by means of a puller bolt or when the bearing arrangement is being assembled by means of a hub bolt.

Figure 2:
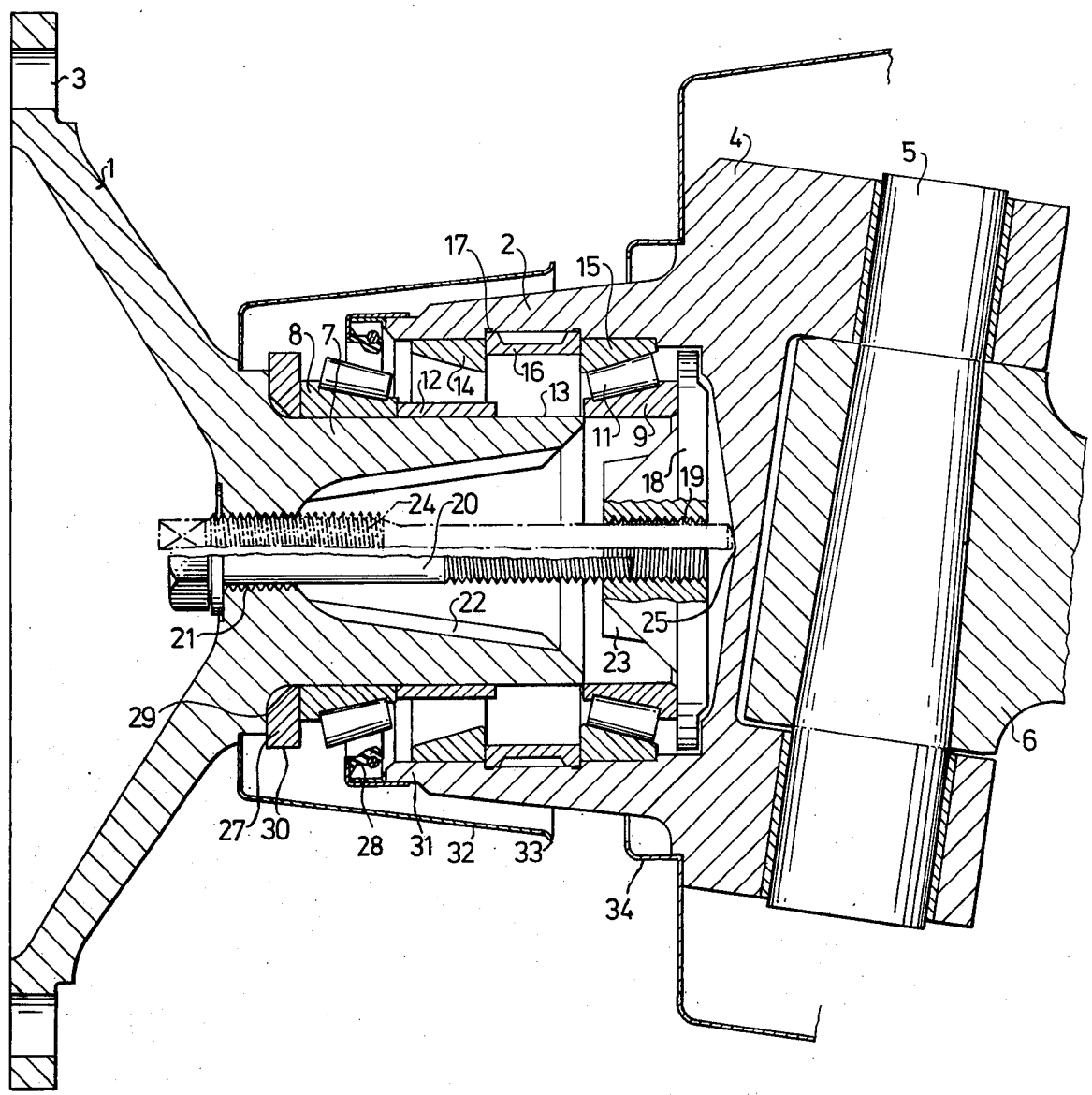

Both FIGS. 1 and 2 are halved at the central portion of the bearing arrangement so that the lower halves of the figures illustrate the position of the hub bolt when the bearing arrangement is being assembled and the upper halves of the figures illustrate the position of the puller bolt when the bearing is being disassembled.

In the bearing arrangement for a front wheel of a vehicle shown in FIG. 1, a wheel hub 1 is rotatably journalled in a spindle sleeve 2. The wheel hub 1 is shaped as a plate and its peripheral section is provided with a number of holes 3 which make it possible for the hub 1 to be attached by means of bolt joints (not shown here) to a brake drum (not shown here) and a wheel (not shown here). The hub 1 has a hub neck 7 which is inserted in the spindle sleeve 2 which is integral with a steering spindle 4. The latter is by means of a king pin 5 pivotably supported on the front axle 6 of the vehicle.

The hub neck 7, which to a great extent is hollow in order to reduce the weight of the wheel hub 1, supports the inner rings 8,9 of two pairmounted conical roller bearings 10,11. Said roller bearings constitute connecting means between the hub 1 and the spindle sleeve 2. An inner spacer sleeve 12 is arranged between said inner rings 8,9. Both said spacer sleeve and the inner rings 8,9 are manufactured with great measurement accuracy with regard to width of the bearings and, thus, it is possible to obtain required axial play without using shims. This expediates assembly work substantially.

The outer rings 14,15 of the roller bearings are pressed into the spindle sleeve 2 and are in contact with finely finished inner surfaces. An outer spacer sleeve 16 is arranged between the outer rings 14,15. Said outer spacer sleeve has a split periphery so as to, during assembly, spring into a turned cavity 17 having a diameter that is greater than the diameter of the abutment surfaces of the roller bearings in the spindle sleeve 2. In this manner, the outer spacer sleeve 16 functions as a locking ring for the inner roller bearing 11.

Inside the inner roller bearing 11 within the spindle sleeve 2, a nut 18 having a flange abuts the inner ring 9 of the inner bearing. The nut 18 has a threaded central hole 19 into which a hub bolt 20 is screwed, said hub bolt passing freely through a corresponding, threaded central hole 21 in the hub neck 7. The hub bolt 20, half of which is shown immediately below the symmetrical axis of the bearing arrangement in both of the figures, serves to secure the bearing arrangement in an axial direction. The hub neck 7 has inner recesses and projections 22 which engage in recesses and projections 23 on the nut 18, whereby securing of the bearing arrangement in an axial direction by the hub bolt 20 also entails radial locking of the hub neck 7 in relation to the nut 18.

The bearing arrangement is provided with an outwardly protecting sealing arrangement 26 which is positioned outside of the outer roller bearing 10. A wear ring 27 and a sealing ring 28 abutting the periphery of the same are included in said sealing arrangement 26. The wear ring 27 is mounted on the hub neck 7 between a shoulder 29 designed on the same and the inner ring 8 of the outer roller bearing 10, whereby the wear ring 27 joins the rotary movement of the hub neck 7. A stationary sealing ring 28, which is attached to the end part 31 of the spindle sleeve 2 in a conventional manner, abuts the peripheral surface 30 of the wear ring 27 in sealing gliding contact.

A protective sleeve 32 having axial extension towards the steering spindle 4 is attached to the hub 1. The protective sleeve 32 has a length essentially corresponding to the length of the hub neck 7. That end of the protective sleeve 32 which faces the steering spindle 4 is provided with a radial, outwardly curved edge 33 which ends inside a protective ring 34 attached to the steering spindle 4 and situated outside of the spindle sleeve 2. By means of the protective sleeve 32 and the protective ring 34 having this design, the assembled bearing arrangement is protected from gravel, sand and other impurities which can destroy the sealing contact between the sealing ring 28 and the wear ring 27.

The protective sleeve 32 also serves to protect the bearing parts arranged on the hub neck 7 during assembly and disassembly. The protective sleeve 32 also serves as protection against soilage and rough treatment in these cases in which an assemblyman places the hub 1 on an assembly hall floor or an assembly bench.

When assembling the bearing arrangement according to the present invention, the nut 18 is first placed in the spindle sleeve 2, after which the inner roller bearing 11 is, with force fit, inserted into the sleeve 2 to such an extent that the outer locking ring and spacer sleeve 16 inserted thereafter can spring into the turned cavity 17. Finally, the outer ring 14 of the outer roller bearing is pressed into the spindle sleeve and the sealing ring 28 is attached at the end 31 of the spindle sleeve.

The wear ring 27, the inner ring 8 of the outer roller bearing together with its roller bodies, and the inner spacer sleeve 12 are pressed onto the hub neck 7 in succession. Both assembly in the spindle sleeve 2 and assembly onto the hub neck 7 can be carried out by the assemblyman at his workbench. Thereafter, the assembly of the bearing arrangement can take place by means of the hub neck 7 being inserted into the preassembled spindle sleeve 2. The hub bolt 20, whose lower half is shown immediately below the symmetry line of the bearing arrangement shown in FIG. 2, is passed through the central hole 27 of the hub neck 7 and when the end of the hub neck 7 comes into contact with the inner ring 9 of the inner roller bearing, the hub bolt 20 is screwed into the threaded central hole 19 on the nut 18. The hub bolt 20 can thereafter be tightened by means of a suitable nut tightening tool to a torque prescribed for the bearing arrangement.

Immediately above the symmetry axis of the bearing arrangement in FIGS. 1 and 2, it is shown in a corresponding manner how a puller bolt 24 is inserted for disassembly of the bearing arrangement. The puller bolt 24 cooperates with the threaded central hole of the hub neck 7 and passes freely through the central hole 21 of the nut prior to its pulling the hub 1 out of the spindle sleeve 2 while being supported against the bottom 25 of the spindle sleeve 2.

The invention is not restricted to the above-described embodiment. Rather, changes and modifications can be made within the framework of the following claims.

What I claim is:

1. Bearing arrangement for a non-powered wheel on vehicles of the kind wherein the hub of the wheel has a hub neck which engages in a sleeve which is non-rotatably secured in the vehicle, two roller bearings being arranged between the hub neck and the sleeve, the hub and the roller bearings being held in the assembled position in the sleeve by means of a centrally positioned hub bolt, the improvement wherein each roller bearing has inner and outer rings, said roller bearings having races inclined towards each other, and inner and outer spacer sleeves are arranged between the respective inner and outer rings of the roller bearings, said hub bolt passing freely through a central hole of the hub from the outer side of the same and being screwed into a nut surrounded by the sleeve and locked against axial movement.

2. Bearing arrangement according to claim 1, characterized in that the hub neck and the nut are designed to engage in each other during assembly of the bearing arrangement so as to form a mutually non-rotatable connection, and in that the nut is provided with a flange arranged to abut the inner axial end surface of the inner ring of the inner roller bearing.

3. Bearing arrangement according to claim 2, characterized in that the nut, the inner roller bearing, the outer spacer sleeve and the outer ring of the outer roller bearing are premounted in the sleeve and that a wear ring, the inner ring of the outer roller bearing together with roller bodies, and the inner spacer sleeve are premounted onto the hub neck prior to the final assembly of the bearing arrangement.

4. Bearing arrangement according to claim 3, characterized in that the spacer sleeve arranged between the outer rings of the roller bearings is split in order to spring into a turned cavity in the sleeve and therewith lock the inner roller bearing and the nut against axial displacement.

5. Bearing arrangement according to claim 3, characterized in that a protective sleeve having an axial extension essentially equal to the length of the hub neck is attached to the hub, said protective sleeve surrounding the sleeve when the bearing arrangement is assembled.

6. Bearing arrangement according to claim 3, characterized in that the central hole of the hub is provided with threads for support of a puller bolt which is advantageously used during disassembly of the bearing arrangement, said puller bolt therewith freely passing through the threaded hole of the nut, the inner end of said bolt abutting a bottom in the sleeve.

7. Bearing arrangement according to claim 3, characterized in that the sleeve is rigidly connected with a steering spindle which is pivotally supported on the front axle of the vehicle.

* * * * *